UNITED STATES PATENT OFFICE.

S. P. McCROSKEY, OF MONROE, ASSIGNOR TO HIMSELF AND WM. D. NICHOLS, OF DAVENPORT, IOWA.

PREPARATION TO RENDER MAIZE SUITABLE FOR GRINDING.

Specification forming part of Letters Patent No. 32,448, dated May 28, 1861.

*To all whom it may concern:*

Be it known that I, S. P. McCROSKEY, of Monroe, in the county of Jasper and State of Iowa, have invented a new Process for Manufacturing Flour from Indian Corn, which I call "Maizenia;" and I do hereby declare the following is a full and accurate description thereof.

When Indian corn is ground in its natural state to the degree of fineness sufficient for flour, the oil of the corn causes the stones and the bolt to gum up, thereby preventing the grinding, and the yield of the flour is very small, being not to exceed eight pounds to the bushel. This flour, thus obtained, is of little value for food, as it is very clammy, being in that state generally called "killed" in grinding, and it has a much stronger taste than ordinary cornmeal. By my invention I obviate all of these difficulties. The flour is light and soft, being hard to tell from spring-wheat flour. It makes choice biscuit, light-bread, or cakes, and many prefer it to wheat. The corn grinds and bolts perfectly free, as much so as wheat, and the yield of flour is from twenty to thirty pounds per bushel, owing to the dryness of the corn, without re-grinding the returns or meal. The flour, when baked, has none or very little of the corn taste, which is owing to the oil of the corn being decomposed or neutralized while grinding; yet it is equally as nutritious and healthy. The balance of the corn not made into flour makes choice meal.

To enable others to know how to make my maizenia or corn-flour, I will state the process.

I take ten parts of bicarbonate of soda, and one part of cream of tartar, and one part of tartaric acid, and one-half part of whiting; and, mixing them thoroughly, I put a heaping teaspoonful to a half-bushel of corn. Then I grind and bolt it in the same way as for wheat. If the corn is damp, I use more of the compound. I use the soda, cream of tartar, and tartaric acid to neutralize or decompose the oil of the corn, and the whiting to absorb what moisture has not been decomposed in that chemical action, thereby rendering the corn more easily ground and the flour more dry. The soda and cream of tartar, or the soda and tartaric acid, or the soda alone might be used with partial success; but I prefer them all combined in such proportions as to accomplish the object above stated.

The whiting might be dispensed with in the compound; but I find that flour bolts more readily with it; hence I use it.

Saleratus could be used in place of the soda; but I prefer soda.

Corn treated with this process is ready for grinding as soon as the compound is added.

I mix the compound with the Indian corn by thoroughly stirring them together either in the hopper, the stock-hopper, or half-bushel, whichever is the most convenient.

What I claim as my invention, and desire to secure by Letters Patent, is—

The process of treating Indian corn preparatory to grinding, with the compound, substantially as therein described, without limiting myself to the exact proportion of elements specified.

In witness whereof I hereunto set my hand this 26th day of March, 1861.

S. P. McCROSKEY.

Witnesses:
WM. HOWARD,
GEORGE RYAN.